No. 860,573. PATENTED JULY 16, 1907.
W. B. SAYERS.
TURBINE.
APPLICATION FILED MAR. 12, 1907.

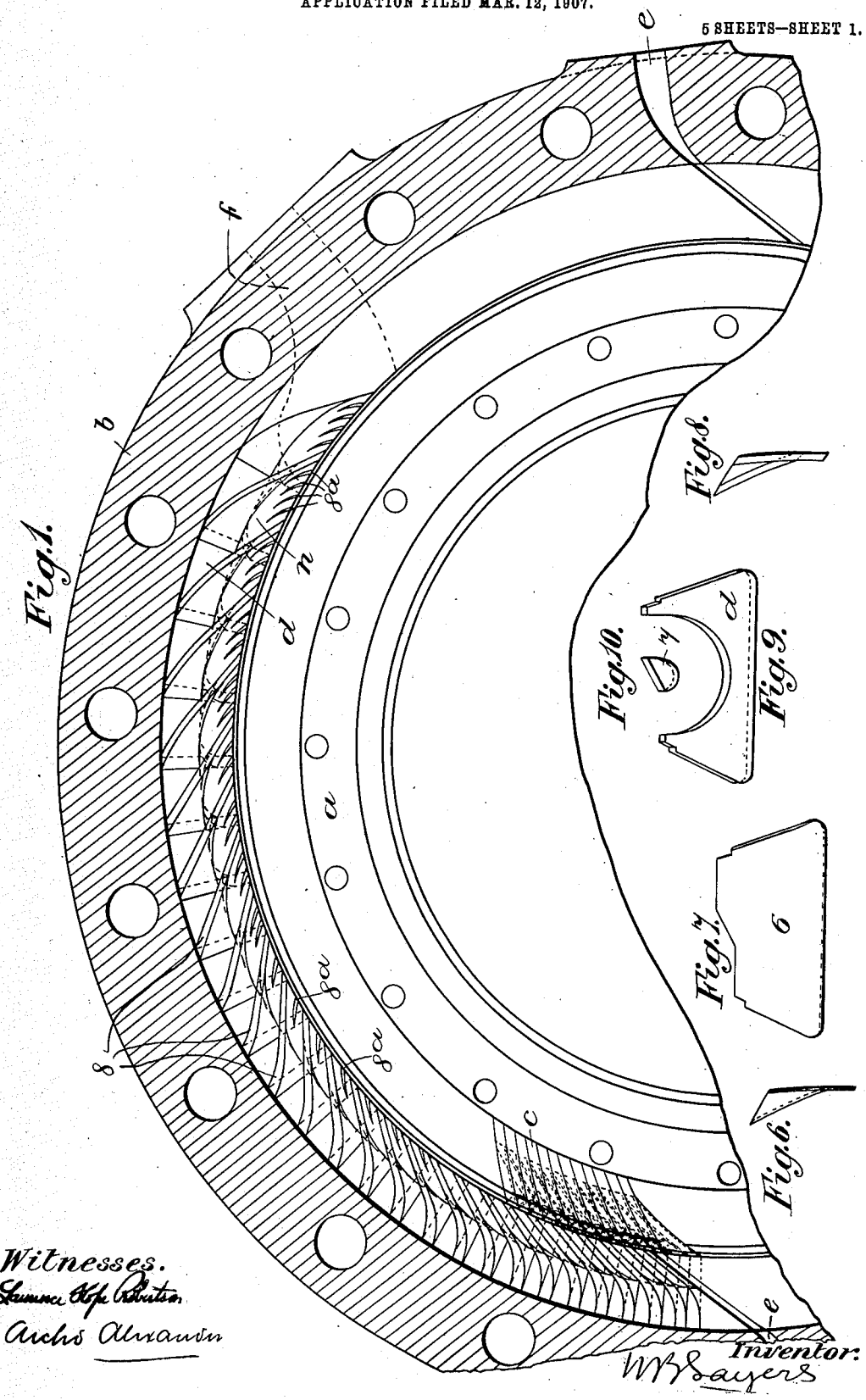

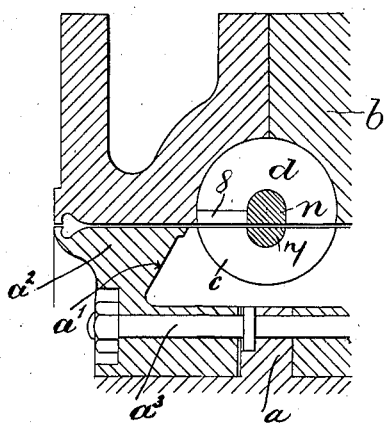
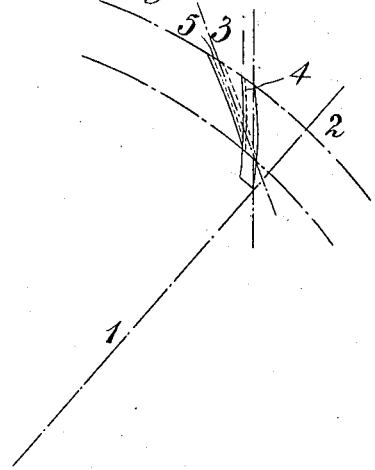
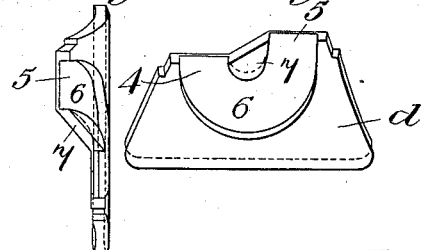
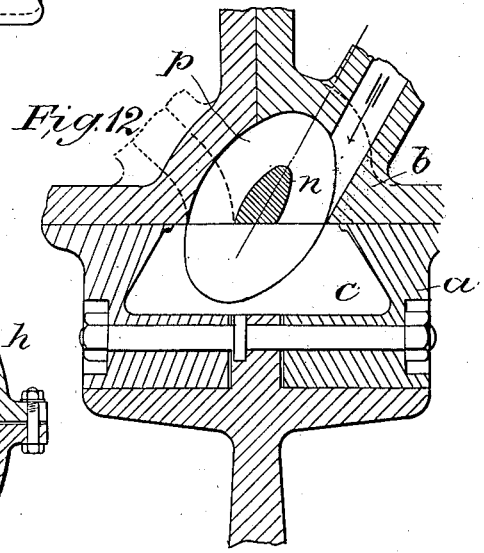
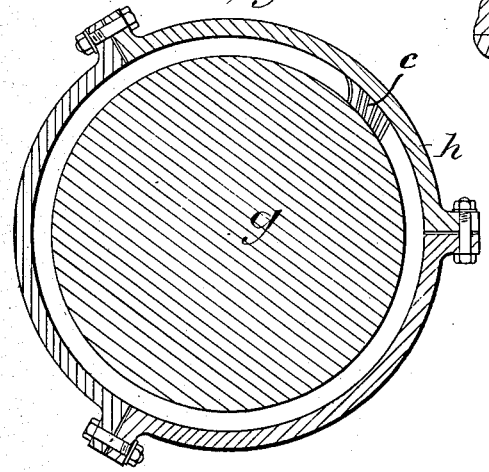

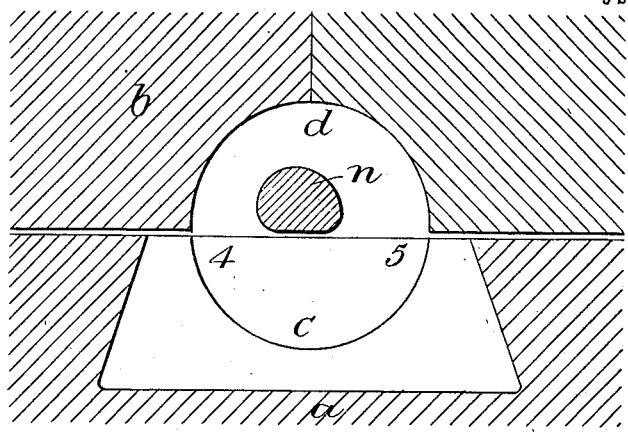
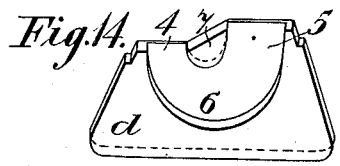
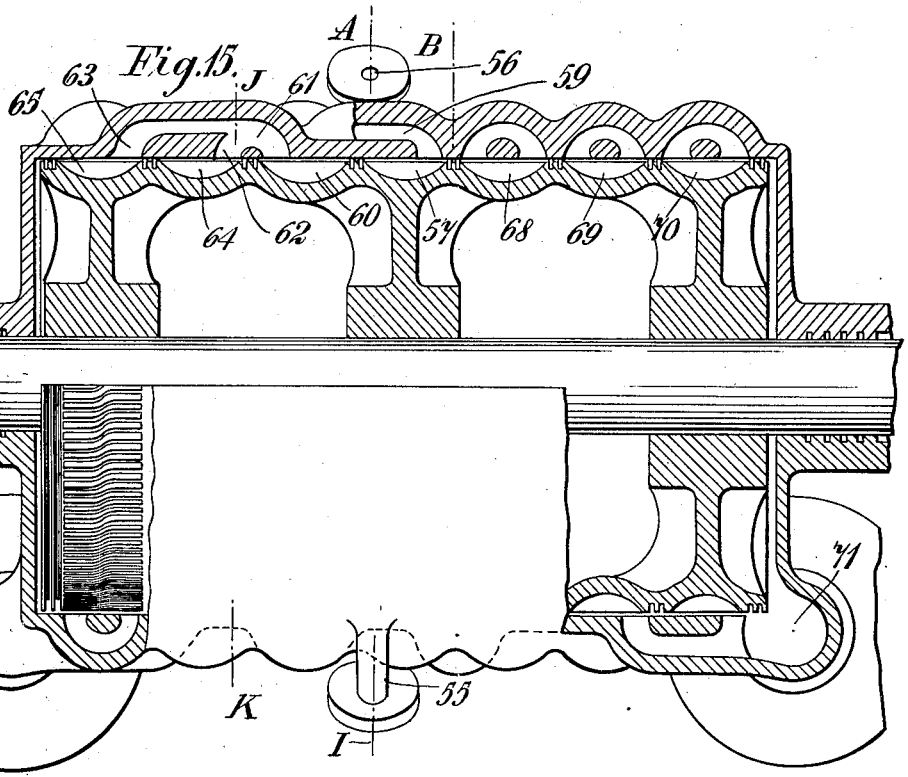

5 SHEETS—SHEET 4.

Witnesses.

Inventor

No. 860,573. PATENTED JULY 16, 1907.
W. B. SAYERS.
TURBINE.
APPLICATION FILED MAR. 12, 1907.

5 SHEETS—SHEET 5.

Witnesses.

Inventor

UNITED STATES PATENT OFFICE.

WILLIAM BROOKS SAYERS, OF GLASGOW, SCOTLAND.

TURBINE.

No. 860,573.　　　　　Specification of Letters Patent.　　　　　Patented July 16, 1907.

Application filed March 12, 1907. Serial No. 362,070.

*To all whom it may concern:*

Be it known that I, WILLIAM BROOKS SAYERS, a subject of the King of Great Britain and Ireland, residing at Glasgow, in the county of Lanark, Scotland, have invented Improvements in and Relating to Turbines, of which the following is a specification.

This invention relates to the construction of mixed flow elastic-fluid turbines of the type wherein the motive fluid is caused by guide passages of gradually increasing cross sectional area to pass through the rotor and the stator in a path which gradually increases in cross section from an inlet to an outlet so that the pressure of the fluid is gradually converted into velocity, the velocity, however, being reduced at successive stages by the reactions of the rotor buckets so that it is not materially greater at the end than at the beginning, the path being approximately spiral or helical.

In turbines of this type it has been proposed to form the rotor with a cylindrical periphery provided with a ring of buckets and to construct the stator in the form of a hollow cylinder surrounding the rotor and provided with a ring of reversing chambers which are so formed that motive fluid will pass from an inlet to an outlet alternately through buckets and through members of a series of the reversing chambers, the members of which series gradually increase in cross section sometimes both individually and in succession, but always in succession, in the direction from the inlet to the outlet and so guide the fluid that when it issues from one side of the ring of buckets it is caused to pass over to and to enter the other side thereof and so on until the outlet is reached. The reversing chambers are or may be provided with vanes to cause the fluid to be directed in the most effective manner into the buckets.

Now the object of the present invention is to increase the efficiency of such a turbine, more especially by modifying the bucket vanes in such a manner that the inlet side of the bucket vanes is more nearly radial than the outlet side thereof as will hereinafter appear.

Figure 16:
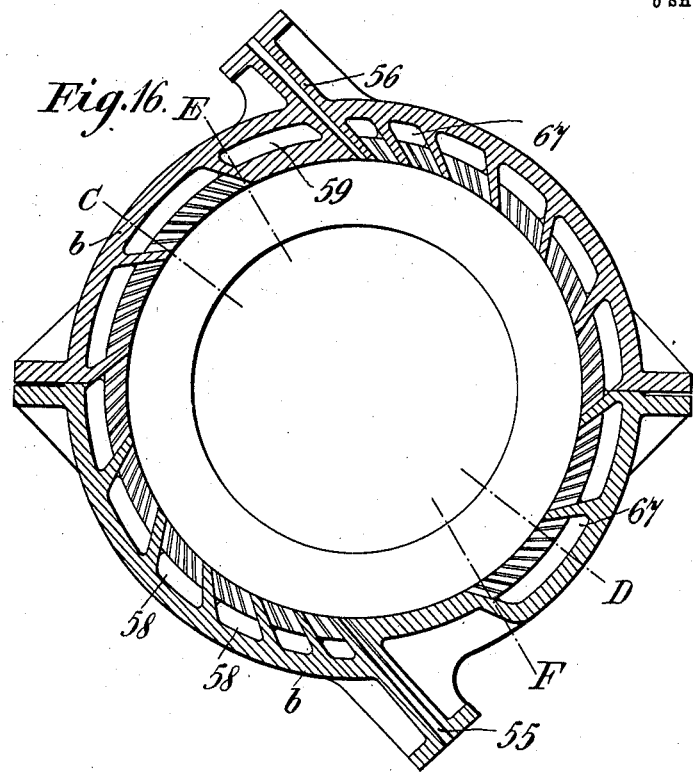
Figure 17:
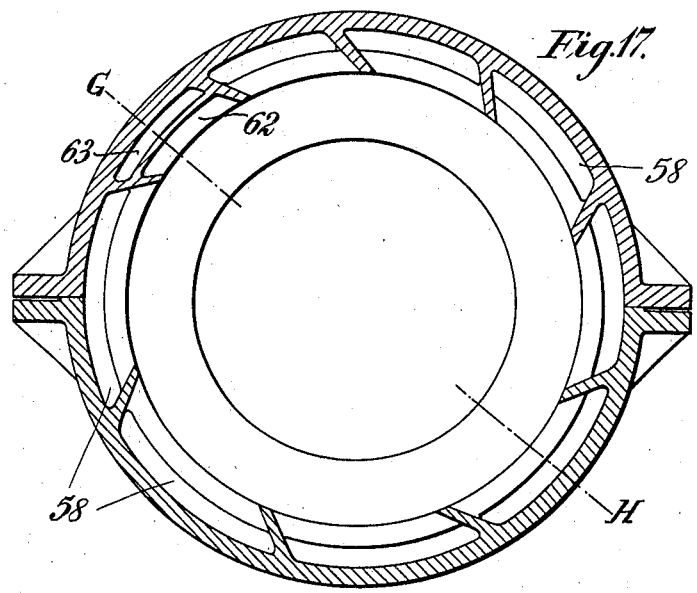
Figure 18:
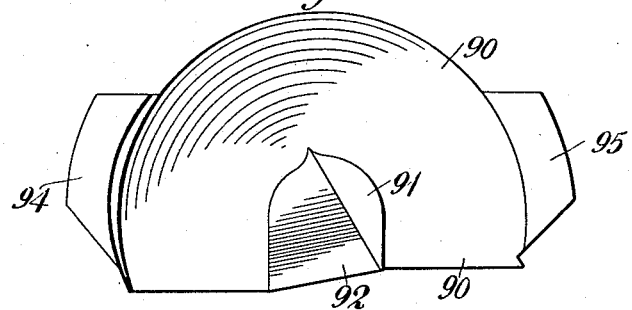
Figure 19:
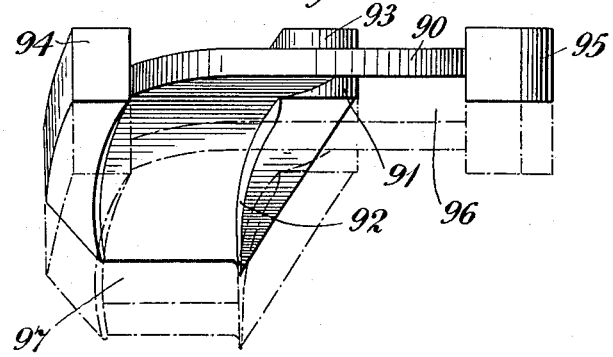
Figure 20:
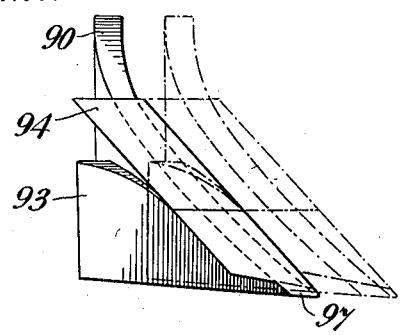

In the accompanying illustrative drawings, Figures 1 and 2 are respectively sectional views, taken at right angles to each other, of a portion of a single ring mixed flow turbine. Figs. 3, 4 and 5 are detail views illustrating one formation of rotor bucket. Figs. 6 to 10 inclusive are detail views illustrating another formation of the bucket. Fig. 11 is a sectional view illustrating a mode of assembling the buckets of the turbine rotor. Figs. 12 and 13 are views similar to Fig. 2 illustrating modifications. Fig. 14 is a view of a modified form of rotor bucket. Figs. 15, 16 and 17 represent, by way of example, a turbine according to this invention wherein the motive fluid is to be supplied first to a centrally arranged ring of buckets from which the exhaust fluid will pass to rings of buckets on opposite sides thereof, Fig. 15 being a sectional view corresponding, as regards the portion from A to B, to the line C D of Fig. 16, as regards the portion to the right of B, to the line E F of Fig. 16, and as regards the portion to the left of A to the line G H of Fig. 17; Fig. 16 a cross section corresponding to the line $A^1$ of Fig. 15; and Fig. 17 a section corresponding to the line J K of Fig. 15. Figs. 18, 19 and 20 show respectively in three elevations at right angles to one another, a blade or vane constituting an element of the reversing chambers of the stator.

In Figs. 1 and 2, $a$ is the rotor and $b$ the stator, the external periphery of the rotor $a$ and the internal periphery of the stator $b$, which surrounds the rotor $a$, being cylindrical. $c$ is a ring of buckets within the periphery of the rotor $a$; $d$ are the reversing chambers which are arranged at the internal periphery of the stator and around the buckets $c$ in the form of a ring. In the example shown, it is intended to employ two series of reversing chambers $d$, one at the upper part and the other at the lower part of the rotor $b$. Corresponding to each of the two series of reversing chambers there are a motive fluid inlet and an exhaust fluid outlet respectively indicated at $e$ and $f$. The inlet side of each vane or bucket $c$ is made more nearly radial than the outlet side thereof. This mode of formation is much facilitated by the manufacture of the buckets by means of plates and blocks since the blocks and plates can be caused, by bending, to give the required difference of angle and consequent curvature.

Fig. 3 shows the position of the bucket in relation to the radius 1 of the rotor; Fig. 4 represents the bucket as seen in the direction of the arrow 2 of Fig. 3; and Fig. 5 shows a bucket as seen in the direction of the arrow 3 of Fig. 3. The block is so formed that the cavity of the bucket has a gradual rearward inclination from its inlet 4 to its outlet 5 (see Fig. 5) so that the outlet side of the wall 6 of the bucket is less radial than the inlet side thereof, 7 is a projection formed on the wall 6 for the purpose of constituting part of a core such as that shown at 7 in Fig. 2.

Figs. 6 to 10 inclusive show several parts of a bucket composed of a separate plate and block arranged alternately around the rotor and bent so that the cavity or passage of the bucket is similar in form to that shown in Figs. 3, 4 and 5, Figs. 6 and 7 are views corresponding to Figs. 3 and 4 respectively, of the plate 6, and Figs. 8 and 9 are similar views of the block $d$, while Fig. 10 represents the shape and the position in relation to the block of a small attachment 7 which is suitably secured to the plate 6 so as to correspond to the projection 7 shown in Fig. 4.

In Figs. 1 and 2, the rotor is provided with buckets like that shown in Figs. 3, 4 and 5; while the reversing chambers are shown as provided with vanes 8 to cause the motive fluid to be directed in the most effective manner into the buckets, some of the wider of the reversing chambers $d$ of the stator $b$ being provided with directing vanes $8^a$ for this purpose.

It will be seen from Figs. 3 and 8 that when the formation described is adopted, the cross sectional area of the passage in the bucket decreases between the inlet and the outlet owing to the difference of inclination of the passage at the inlet and the outlet to the radii of the rotor at the places in question.

Before being put into the rotor, the plates 6 and blocks $d$ to constitute a ring of buckets are sometimes placed together around a former in their normal positions relative to one another and then surrounded by a band the plates and blocks being formed dovetail fashion and arranged to overlap the sides of the former to an extent corresponding more or less with the depth of a groove in one part of the rotor so that after the overlapping portion of the ring of buckets is engaged with such groove, the former can be removed. The remaining similarly grooved portion of the rotor body can then be placed in position and secured by means of bolts in such a manner as to clamp the ring of buckets firmly in position. Finally the surrounding band is removed. The whole periphery of the rotor, formed partly by the body and partly by the buckets, is then ground so as to form a truly cylindrical surface.

Fig. 11 shows a number of plates 6 and blocks $d$ such as those shown in Figs. 6 and 8, arranged alternately around a former $g$ and surrounded as above described, by a band $h$ made in three parts connected together by bolts. The ring of buckets constituted by the plates and blocks arranged around the former $g$ is, after being clamped within the band $h$ by means of the bolts of the latter, transferred as a whole to a groove $a^1$ in a portion $a^2$ of the body of the rotor $a$ (Fig. 2) to which, after the removal of the former $g$, another similarly grooved portion of the rotor body is then secured by means of bolts $a^3$ so as to clamp the ring of buckets $c$ between the two parts. The passages constituted by the buckets $c$ and reversing chambers $d$ need not be circular in projections transverse to their length; in some cases they are more or less elliptical, with the major axes of their projections inclined to the plane containing corresponding radii of the rotor. The inner and outer peripheral surfaces of the passage will generally more or less correspond in cross section so that when a ring is employed to form the reversing chambers its cross section will usually be similar in shape to such peripheral surfaces.

Fig. 12 shows an example in which the passage constituted by buckets and reversing chambers is approximately elliptical in cross section and the major axis of the cross section is inclined to the plane containing the radius of the rotor at that place; the periphery of the ring $n$ of the reversing chambers is of a cross sectional shape similar to that of the periphery of the annular recess $p$ in the stator body. Furthermore, I sometimes form the buckets so that each of them increases in internal cross section from the inlet to the outlet. In this case, when the buckets have no core, they are arranged so that they project at one side more than at the other from the core of the stator, and when the buckets have a core the latter is arranged nearer to one side of them than to the other.

Fig. 13 illustrates this construction in the case of an uncored bucket; the core $n$ of the stator is rather nearer to the internal periphery of the bucket (and also to the external periphery of the stator passage) at the inlet side 4 of the bucket than at the outlet side 5 thereof.

Fig. 14 illustrates this construction in respect of a bucket provided with a core 7 similar to that shown in Fig. 4; it will be seen that the outlet 5 of the cavity or passage of the bucket is considerably wider than the inlet 4 thereof. In both these cases the increase of pitch of the reversing chambers in the stator will advance in geometrical progression.

In some cases I make a turbine with a single row or ring of buckets; such a turbine is shown in Figs. 1 and 2. In other cases a turbine comprises two or more rings of buckets, which may be either equal in diameter or of increasing diameter from ring to ring.

When the rings of buckets are equal in diameter the motive fluid may be caused to pass from ring to ring successively; in order, however, to utilize more efficiently the expansion of the fluid in a turbine of a given diameter, the fluid is sometimes caused to pass from one ring to two or more other rings simultaneously; in either case the ring to which the fluid will be first supplied may be arranged centrally and ports may be provided to lead the motive fluid therefrom to other rings at opposite sides of it. Figs. 15, 16 and 17 show a turbine of this kind. The turbine is provided with two inlets 55 and 56 for motive fluid, both of which lead to the central ring of buckets 57. The motive fluid admitted through the inlet 55 travels successively through the several members of the series of reversing chambers 58 (Fig. 16) and then, after once more passing across the ring of buckets 57, it passes through a passage 59 and traverses a ring of buckets 60 to the first of an annular series of reversing chambers, which corresponds to the ring of buckets 60, and after passing through this series it in a similar manner enters a passage 61, wherein it divides into two streams which flow along passages 62 and 63 respectively to rings of buckets 64 and 65 each of which is provided with an annular series of reversing chambers 58 (see Fig. 17) which successively increase in cross section from a dimension corresponding more or less to the cross section of the last reversing chamber of the series corresponding to the series of buckets 60; the streams of exhaust fluid from the rings of buckets 64 and 65 are both led to a common exhaust outlet 66. The motive fluid supplied through the inlet 56 passes in a manner precisely similar to that of the motive fluid supplied through the inlet 55, to the ring of buckets 57, through a series of reversing chambers 67 (Fig. 16) and through a ring of buckets 68, whence it divides into two streams which pass through rings of buckets 69 and 70 respectively to unite and issue through a common exhaust outlet 71.

Instead of making each of the reversing chambers to increase gradually in cross sectional area from its inlet to its outlet as hereinbefore stated, the same may be made of decreasing area in cross section, as by this means with the difference of pressures that would probably obtain between the inlet and the outlet, there would, I consider, be the most efficient conversion of the heat energy of the fluid into kinetic energy of the stream.

Fig. 1 shows the stator provided with reversing chambers of this formation, and Figs. 18, 19 and 20 show respectively in three elevations taken at right angles to one another, a block such as may be used for the construction of a series of such reversing chambers, an adjacent block, forming therewith a reversing chamber, being indicated by dotted lines in Figs. 19 and 20.

90 is the wall for separating the passage of one chamber from the adjacent chamber; 91 92 and 93 are projections adapted to form parts of a core, such as the core $n$ shown in Figs. 1 and 2, while 94 and 95 are lugs formed at the sides of the wall 90 and designed to fit into recesses in the stator body to keep the blocks in position.

It will be seen that in the example, the inlet 96 of the reversing chamber is radial of the stator and is consequently in the best direction for receiving the fluid from a bucket when the bucket is moving at the most advantageous speed for absorbing energy from the stream and when the turbine is designed to secure that the motive fluid will, on leaving a bucket, have no velocity in a direction tangential to the rotor; while the outlet 97 of the reversing chamber is at the proper angle to the radius for directing the stream into the buckets in the most effective manner.

It will be evident that although the areas of the inlet and outlet apertures of the reversing chamber are approximately equal, this is only because of the difference of inclination of the chamber at the inlet and the outlet to the corresponding radii and that the area of a section of the passage at the outlet taken at right angles to the direction of flow of the stream is considerably less than (about half) that of a section taken at the inlet.

What I claim is:—

1. A mixed flow elastic fluid turbine of the type referred to wherein the motive fluid passes successively through passages in the stator or rotor in a common radial plane having rotor buckets or vanes with inlet sides for the motive fluid more nearly radial than the outlet sides, thereby forming a path for the motive fluid which, proceeding from a point in the periphery of the rotor circumferentially in advance of the outlet at another point in the periphery, gradually decreases in cross sectional dimension measured in the direction of the plane of rotation of the rotor.

2. A vane or bucket for the rotor of a turbine of the type referred to, wherein the motive fluid passes successively through passages in the stator and rotor in a common radial plane, having its inlet side more nearly radial than its outlet side so as to form a path for the motive fluid which, proceeding from a point in the periphery of the rotor circumferentially in advance of the outlet at another point in the periphery, gradually decreases in cross sectional dimension measured in the direction of the plane of rotation of the rotor.

3. A mixed flow elastic fluid turbine comprising a stator having a ring of reversing chambers through the individual passages of which the motive fluid passes successively and a rotor in combination therewith having a concentric ring of vanes or buckets which are formed with their inlet sides more nearly radial than their outlet sides thereby forming a path for the motive fluid which in each bucket or vane of the rotor decreases in cross sectional dimension measured in the direction of the plane of rotation of the rotor.

4. A vane or bucket for the rotor of a turbine of the mixed flow type, composed of plates and blocks arranged alternately around the rotor and bent so that each block and the adjacent two plates form a cavity or passage which has a gradual rearward inclination from the inlet side to the outlet side.

5. A mixed flow elastic fluid turbine having reversing chambers in the stator and vanes or buckets on the rotor and through which motive fluid can successively pass, said vanes or buckets being composed of plates and blocks arranged alternately around the rotor and bent so that each block and the adjacent two plates form a cavity or passage which has a gradual rearward inclination from the inlet side to the outlet side.

6. A mixed flow elastic fluid turbine wherein the reversing chambers of the stator and the vanes or buckets of the rotor constitute passages which are more or less elliptical in projections transverse to their length and arranged with the major axes inclined to the plane containing the corresponding radii of the rotor and stator.

7. A mixed flow elastic fluid turbine wherein the motive fluid passes successively through the individual passages of a ring of reversing chambers in the stator alternately with a concentric ring of vanes or buckets on the rotor each of which has its inlet side for the motive fluid more nearly radial than the outlet side and constructed so that the passage diminishes in cross sectional dimension measured in the direction of the plane of rotation of the rotor and increases in cross sectional dimension measured in planes perpendicular thereto.

8. A vane or bucket for the rotor of a turbine having its inlet side more nearly radial than the outlet side thereof and a cross section which decreases in dimension from the inlet to the outlet measured in the direction of the plane of rotation of the rotor and increases in dimension from such inlet to the outlet measured in planes at right angles to the aforesaid plane.

9. An elastic fluid turbine of the mixed flow type comprising a ring of rotor buckets and stator reversing chambers, an inlet for supplying motive fluid to one portion of such ring of buckets and chambers, an inlet for supplying motive fluid to another portion of such ring, and a plurality of rings of buckets and chambers on either side of the first named ring of buckets and chambers, those to one side simultaneously receiving motive fluid exhausted from the portion of the ring corresponding to one inlet and those to the other side simultaneously receiving motive fluid exhausted from the portion of the ring corresponding to the other inlet, said motive fluid traveling to opposite ends of the turbine.

10. An elastic fluid turbine of the mixed flow type wherein motive fluid is admitted to different portions of a ring of fractional power extracting devices comprising stationary reversing chambers and moving buckets or vanes having their inlet sides more nearly radial than their outlet sides, and a plurality of similar fractional power extracting devices arranged on opposite sides of the first named ring and adapted to be supplied simultaneously with motive fluid exhausted from the different portions of such ring.

Signed at 58 St. Vincent street, Glasgow, this twenty-second day of February, 1907.

WILLIAM BROOKS SAYERS.

Witnesses:
LAURENCE HOPE ROBERTSON,
ARCHD. ALEXANDER.